(No Model.)

C. E. BECK.
GEAR WHEEL AND METHOD OF MAKING SAME.

No. 515,137. Patented Feb. 20, 1894.

WITNESSES
Chas. W. Adams
Harry F. Lea

INVENTOR
Charles E. Beck

UNITED STATES PATENT OFFICE.

CHARLES E. BECK, OF ALLEGHENY, PENNSYLVANIA.

GEAR-WHEEL AND METHOD OF MAKING SAME.

SPECIFICATION forming part of Letters Patent No. 515,137, dated February 20, 1894.

Application filed August 9, 1893. Serial No. 482,724. (No model.)

*To all whom it may concern:*

Be it known that I, CHARLES E. BECK, of Allegheny, in the county of Allegheny and State of Pennsylvania, have invented a new and useful Improvement in Gear-Wheels and Method of Making the Same, of which the following is a full, clear, and exact description, reference being had to the accompanying drawings, forming part of this specification, in which—

Figure 1:
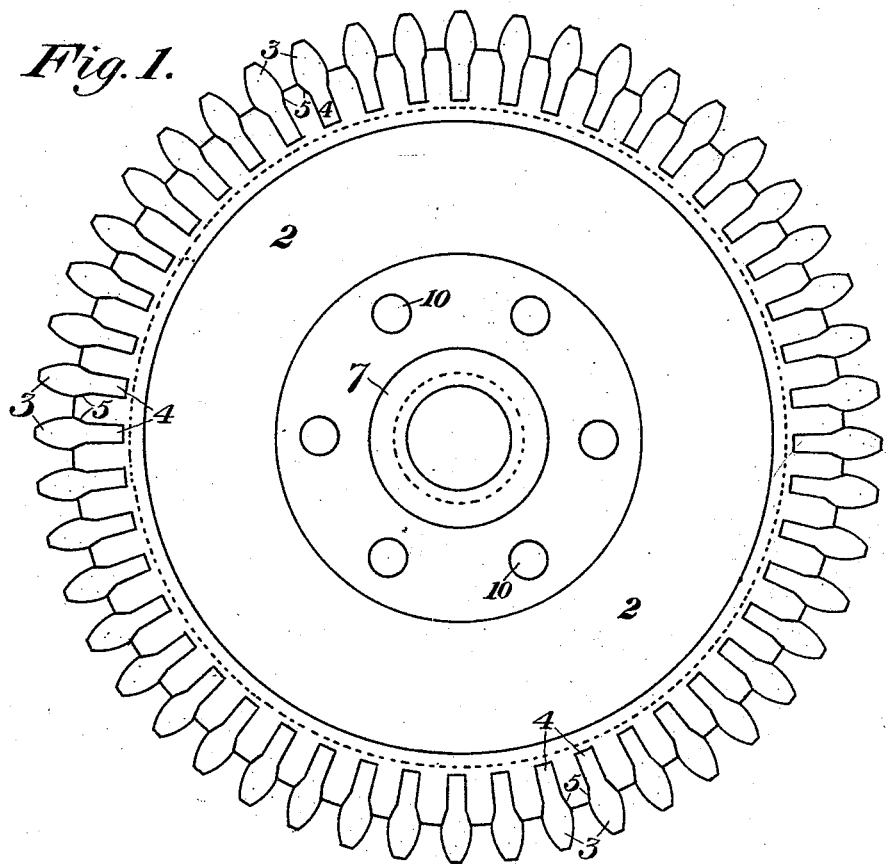
Figure 2:
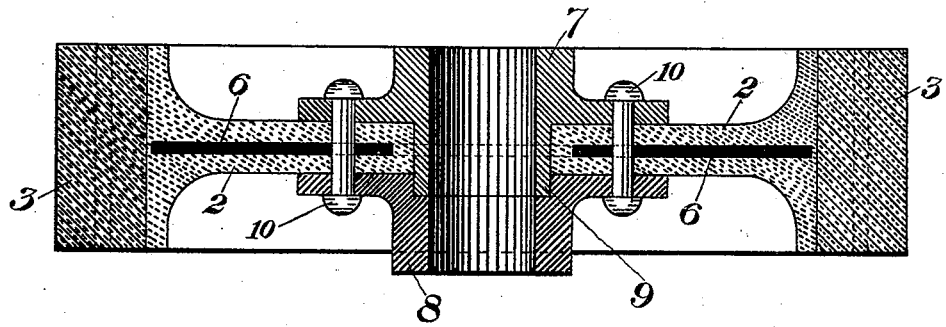

Figure 1 is a top plan view of a wheel constructed in accordance with my invention. Fig. 2 is a vertical central section of the same.

My invention relates to the manufacture of gear-wheels and is designed to produce a simpler, cheaper, and more efficient wheel than has heretofore been employed.

To that end it consists in manufacturing a gear wheel by inserting the teeth in a suitable mold and compressing a paper composition about the same.

It also consists more specifically in inserting the teeth in the mold, placing a stiffening plate or disk therein, and compressing a paper composition about the teeth and the plate.

In the drawings, in which like figures of reference indicate like parts, 2 indicates the body of the wheel which is composed of papier maché, or similar composition, molded and compressed into this form.

3 are the metal teeth having narrow stems 4, joined to the body of the tooth by beveled or inclined faces 5. This peculiar form of tooth and stem is extremely advantageous, as it gives a secure bearing in the paper body, and prevents the tooth being forced out.

6 is a metal disk, which is embedded in the paper body and serves to stiffen and strengthen it.

The hub of the wheel is formed in two parts or hub-rings 7 and 8, one part having a projecting annular collar 9 fitting in a similar recess in the other hub-ring, and the two are secured together by suitable rivets or bolts 10 passing through the two parts of the hub and the stiffening plate 6.

The method of making the wheel is as follows:—The teeth being inserted in suitable recesses provided in the sides of a mold with their stems projecting inwardly, the paper stock or similar material and the stiffening plate are placed in the mold and a heavy pressure brought to bear thereon. The paper is thus compacted or pressed into wheel form and the teeth are firmly secured in place. The wheel may then be removed and bored out to receive the half hubs, or if desired the mold may be provided with a core to form this central hole.

The advantages of the invention result from the extreme lightness of the wheel and its noiselessness as well as in the cheapness of making and the strength of the teeth, they being firmly held in place by their stems.

Many variations may be made in the construction and arrangement of the parts and the paper composition, without departing from my invention, since

What I claim is—

1. The method of manufacturing gear wheels, consisting in inserting teeth in a mold, placing a paper composition in the mold, and compressing the same about the teeth, whereby they are firmly embedded in the wheel body; substantially as described.

2. The method of manufacturing gear wheels, consisting in inserting teeth in a mold, placing a stiffening plate therein, and compressing the paper composition about the teeth and plate; substantially as described.

3. The method of manufacturing gear-wheels, consisting in inserting separate teeth in recesses of the mold, placing a paper composition in the mold, and compressing the same about the teeth, whereby they are firmly embedded in the wheel body; substantially as described.

In testimony whereof I have hereunto set my hand.

CHARLES E. BECK.

Witnesses:
W. B. CORWIN,
H. L. GILL.